United States Patent [19]
Ellis

[11] 3,886,807
[45] June 3, 1975

[54] BICYCLE OPERATING MEANS
[76] Inventor: Robert P. Ellis, 350 Lomas Santa Fe Dr., Solana Beach, Calif. 92075
[22] Filed: Sept. 17, 1973
[21] Appl. No.: 397,641

[52] U.S. Cl. .................................. 74/521; 74/31
[51] Int. Cl. ............................................. G05g 1/04
[58] Field of Search .......... 74/31, 66, 521; 280/244, 280/245

[56] References Cited
UNITED STATES PATENTS

| | | | |
|---|---|---|---|
| 156,383 | 10/1874 | Snow | 74/521 |
| 235,432 | 12/1880 | Hassenpflug | 74/31 |
| 241,862 | 5/1881 | Holden | 74/66 |
| 500,584 | 7/1893 | Kellogg | 74/66 |
| 555,242 | 2/1896 | Hallenbeck | 74/31 |
| 617,884 | 1/1899 | Poe | 74/521 |
| 2,414,774 | 1/1947 | Spinks | 74/521 |

*Primary Examiner*—Samuel Scott
*Assistant Examiner*—Wesley S. Ratliff, Jr.

[57] ABSTRACT

A bicycle operating means having two co-operating features, one in which the customary rotating motion of the foot on the pedals is supplated by the much shorter substantially vertical up and down motion of the feet on a pantograph movement and second, an automatically operated means whereby the pressure of the foot onto the pedals is practically constant, the speed of the bicycle being adjusted thereto even while going uphill, no gears or manipulations being necessary.

8 Claims, 5 Drawing Figures

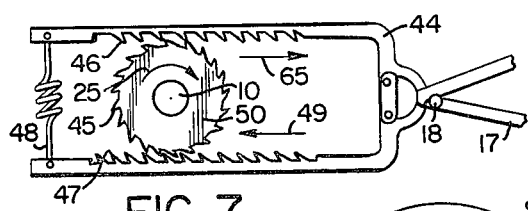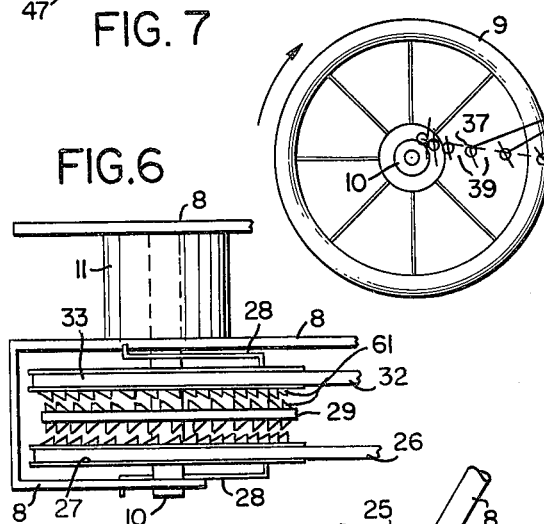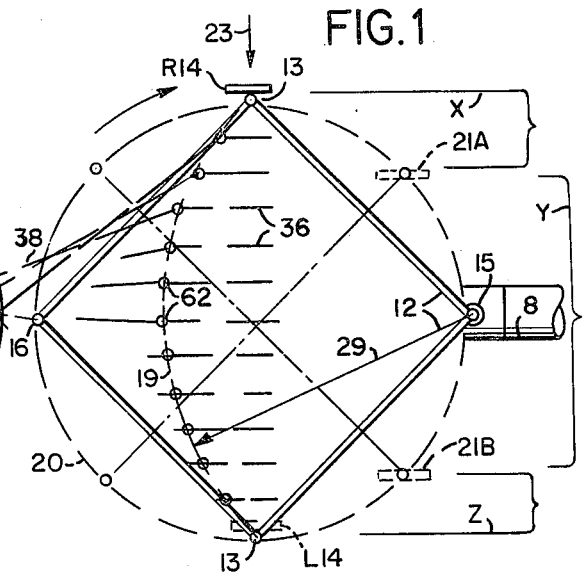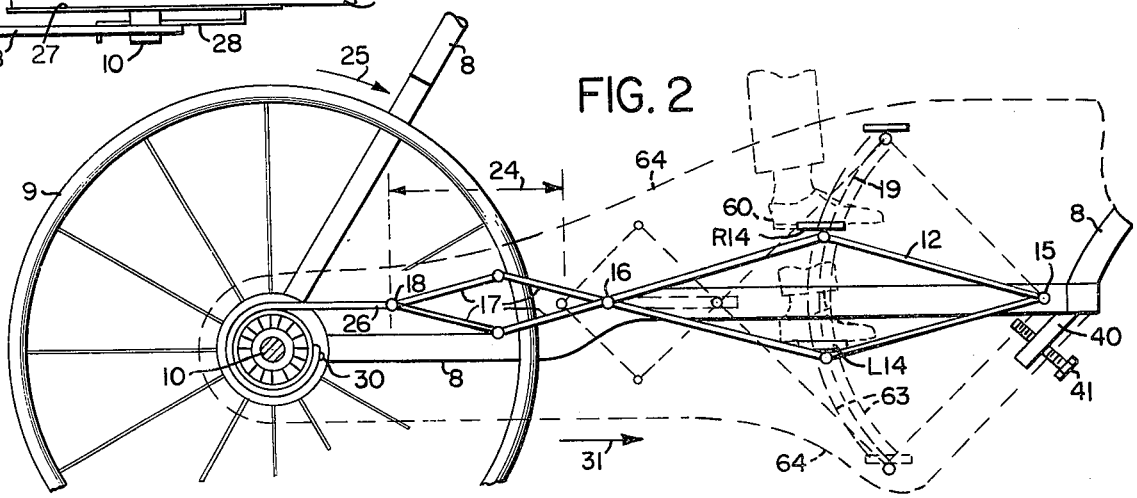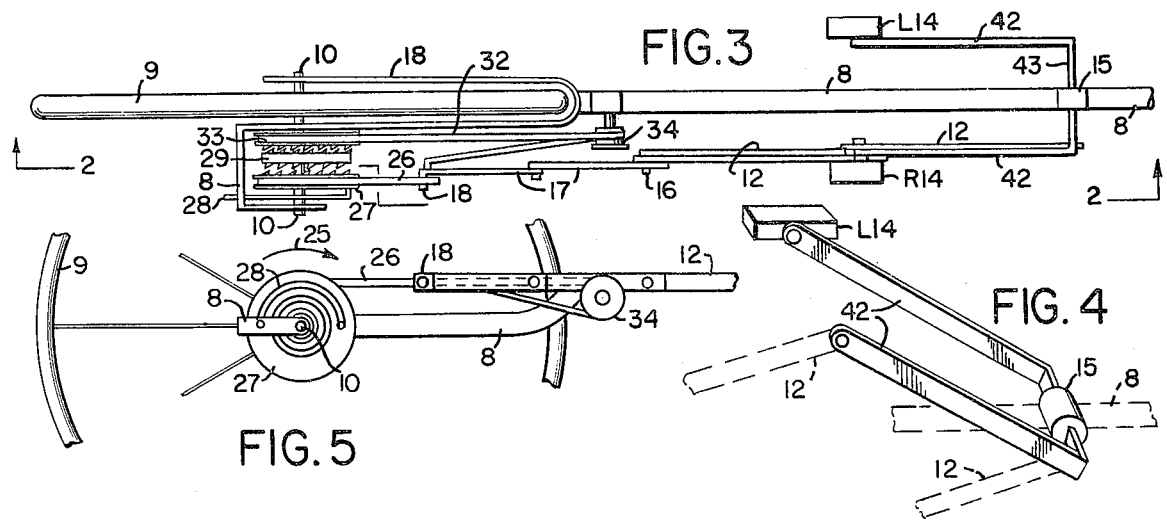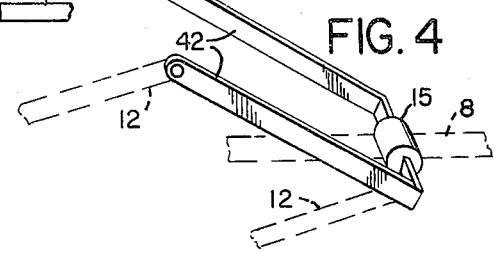

3,886,807

BICYCLE OPERATING MEANS

BACKGROUND & SUMMARY OF THE INVENTION

About 100 years ago the modern bicycle was developed which comprised the still customary chain and sprocket wheel which gave an opportunity of changing the speed thereof together with suitable muscular effort. However the changing of the speed must be accomplished by manual operation when necessary while in operation of the bicycle and the mechanism thereof is generally very skimpy and, due to mud and dust, soon gets out of order.

With the use of my herein disclosed Means for Bicycle Operation the muscular effort and leg movement is gretly diminished compared to the conventional means especially while travelling uphill, the movement of my pedals, instead of being in a circle, being substantially vertical, thus moving only one-third the distance, while the change of speed required while traversing an upward inclined street is automatically obtained exactly in proportion to the degree of inclination, no manipulation of gearing being necessary. In addition, a hill of more than usual inclination can be traversed with less muscular effort and sufficient speed to sustain its equilibrium.

Other and further objects will appear in the specifications and be specifically pointed out in the appended claims, reference being had to the accompanying drawings exemplifying the invention, and in which:

FIG. 1 is a diagram illustrating the graphical features on which my invention is based.

FIG. 2 is an upright sectional view on the line 2--2 of FIG. 3.

FIG. 3 is a top view of FIG. 2.

FIG. 4 is an isometric view of the left side operating pedal and its connection to the right side lazy-tong mechanism.

FIG. 5 is a side view of the rear part of the bicycle.

FIG. 6 is an enlarged top view of part of FIG. 3.

FIG. 7 is a side view of an alternative part of the mechanism shown in FIGS. 2, 3, 5 and 6.

DETAILED DESCRIPTION OF THE PREFERRED EMBODIMENT

Referring to the drawings in which like characters and numerals of reference refer to similar parts throughout the several views, the numeral 8 denotes the general frame of a conventional bicycle while 9 represents the rear wheeland tire, 10 the axle and 11 the hub thereof. Instead of using the conventional sprocket gear and chain for delivering the cyclists muscular power to the bicycle, I use one or more sections of a pantograph or "lazy tong" mechanism 12 to the hinged corners 13 of Which, see FIG. 1, are pivoted the two foot pedals R14 and L14, on each side of the bicycle respectively. These pedals are substantially in vertical alinement due to the fact that the two oppositely disposed hinged joints of the lazy tong mechanism are horizontally secured, the joint 15 to the bicycle frame 8 while the opposite joint 16 is free to move horizontally back and forth according to the relative vertical positions of the pedals R14 and L14. In FIGS. 2 and 3 I show an additional but smaller section 17 of lazy-tong mechanism which is pivoted at 18 to the main lazy-tong section 12 so as to lengthen the distance of movement from the fixed point 15 to longest point 18, being the maximum possible horizontal distance of the lazy-tong mechanism when the pedals R14 and L14 happen to be directly opposite each other at their respective up and down movements along the arc line 19, see FIGS. 1 and 2, which arc is determined by the radius line 29. It will thus be apparent that pedaling this bicycle reduces the length of movement by the feet and legs of the cyclist to one-third that of the conventional sprocket and chain mechanism besides requiring less muscular effort to cover the same distance, as will be hereinafter described. The dotted circle 20 together with the pedals R14 and L14 and 21A and 21B illustrate the distance the foot of the cyclist must now transcribe while the arc line 19 indicates the much smaller distance moved by my system. In addition, considering the circle 20 and the pedal R14 in FIG. 1, a pressure by the cyclists foot onto Pedal R14 in the direction of arrow 23, actually does not create any forward movement to the bicycle as such pressure is directly at right angles, it being not until the pedal reaches point 21A on circle 20 that a sufficiently satisfactory angle is reached to create forward movement to the bicycle. The space indicated by bracket X being practically useless to the energy wasted on this part of the conventional sprocket. The space indicated by bracket Y is the only part of the movement of the pedals that can be called useful, the space Z also being useless as will be aparent. On the other hand, pressure by the foot onto pedal R14 in the direction of arrow 23 causes immediate response when the lazy-tong mechanism is used as there is an angle of 90° which quickly increases the torque to a toggle mechanism as indicated in FIG. 2, this effect progressively increasing as the original 90 degree limbs 12 reach a horizontal position as will be readily apparent. Therefor much less muscular effort is required to propel a bicycle with my lazy-tong mechanism than with the conventional sprocket wheels and chain. The maximum movement of the lazy-tong is indicated by arrow 24 in FIG. 2, which horizontal movement (reciprocal) is caused by the substantial vertical movement 19 as just described. This horizontal reciprocal movement, see FIGS. 2, 3 and 5, creates rotary motion in the direction of arrow 25 to the rear bicycle wheel 9 as follows; to the joint 18 of section 17 of the lazy-tong mechanism I attach the tape or belt 26 which is adapted to wind upon flanged pulley 27 which is normally tensioned by spring 28 to turn opposite to arrow 25 and incidentally toward the adjoining toothed pinion 29 which is fixed to shaft 10. The tape 26 is also secured to the rim of pulley 27 at 30, see FIG. 2 so it cannot slip when pulled in the direction of arrow 31. The inner side of pulley 27 is also toothed and adapted to engage the teeth of fixed pulley 29 when belt 26 is pulled, thus turning bicycle wheel 9 in the direction of arrow 25 and moving the bicycle forward. Simultaneously the belt 32, one end of which is also attached to joint 18, see FIG. 3, is forced rearwardly over pulley 34 and pulling belt 32 to unwind from pulley 33 the attached spring 28 of which forced pulley 33 against fixed pinion 29, the teeth 61 of which pulley and pinion mesh and the pull of pulley 32 will thus rotate pinion 29 and wheel 9 in the direction of arrow 25, see FIGS. 3, 5 and 6.

As the pedals R14 and L14 now pass horizontal dead center, the position of the lazy-tong where both pedals pass each other, pedal L14 having moved upwardly while pedal R14 was moving down, the lazy tong mechanism will again attain the position illustrated in FIG.

1, during which movement the lazy-tong limbs 12 were in tension and the tape 26 pulled pulley 27 in the direction of arrow 25, the spring 28 attached to pinion 29 continuing its rotation in the direction of arrow 25, practically without stopping. This proceedure will continue as long as the pedals R14 and L14 reciprocate in the usual manner of bicycling, it being understood that the same results occur when the pedal L14 is depressed.

It will thus be apparent that at each complete downward stroke of either pedal R14 or L14 the pantograph will first create a compression of the links 12 causing the pantograph to expand rearwardly and causing pulley 33 to rotate in the direction of arrow 25 until the links 12 are at horizontal "dead center" or parallel with each other and the pedals pass each other, the links 12 will then assume a relative position up to 90° as indicated in FIG. 1, with the pedals now on top and bottom respectively, during this latter movement the links 12 having been in tension. It will thus be apparent that a considerable amount of muscular effort and knee bending has been eliminated by the above method of operation.

Referring now again to the diagram in FIG. 1, I have noticed that, with the forward corner 15 of the pantograph pivoted to the bicycle frame 8 as shown, and equal distances 36 of downward motion from pedal R14, the co-inciding horizontal distances 37 are gradually lessened, note equal length lines 38 extending from points 62 on pedal line 19. This feature has led me to evolve an automatically operated "change Gear" means for the bicycle without the use of any other mechanism except as already illustrated and described. As the cyclist depresses padal R14 along line 19, the adjoining parallel dotted lines 63 constituting a slot in a sheet metal guard outlined by the dotted lines 64, the resulting horizontal distance 37 of the pantograph gradually lessen in proportion to the equal vertical distances of pedal distances 36, see FIG. 1, thus requiring corresponding proportionate lesser pressure on the pedal for the same rotative distance for wheel 9, or vice versa, for the same vertical pressure on pedal R14 the distance traversed by wheel 9 becomes gradually less but overcomes a correspondingly greater torque, i.e., for the bicycle traversing a hill. It will be apparent that, in actual practice, if a hill be encountered, the uppermost and lowermost parts of the downward stroke of the pedal will require muscular power and provide greater speed than the intermediate portion thereof and consequently, the cyclist being conscious of this difference through the reaction on his feet, especially when traveling over an incline, will react onto the pedal accordingly at some appropriate upper intermediate distance, say at point 39 in FIG. 1, thus requiring only the same muscular downward pressure onto the pedal as had been required while traversing at higher speed on level ground, which speed was originally regulated to occur when the pedal R14 was at fully uppermost position. It will thus be apparent that on a steep hill the pedals can and would automatically reciprocate only between each side of a restricted horizontal "dead center" between a few of the smaller distance points 37, as illustrated by FIG. 2, thus automatically changing the ratio of a steady muscular effort by the cyclist to that of a reduced speed and greater torque to the bicycle, this ratio being easily as much as eight to one from a practical standpoint. Thus no speed change gear is required with its consequent troublesome operating means and repair bills. A cyclist may therefor completely disregard any uphill roads as it will automatically adjust itself. In the position illustrated in FIG. 2, the lazy-tong becomes a "toggle," it being apparent that the lazy-tong assembly can exert a tremendous horizontal pressure by only a slight pressure on the pedals, making the steepest hill easy to climb with sufficient speed to retain the cyclists equilibrium.

To limit the height of movement of the pedals R14 and L14 I provide an adjustable limiting means by the frame extension 40 secured to frame 8 through which extension a threaded bolt 41 limits the movement of the link 12 which will therefor limit the height of the pedals, as desired, FIG. 2.

From a practical standpoint it would be a difficult matter to apply the pedal L14 on the left side of the bicycle to operate in conjunction with pedal R14 on the right side thereof without altering the frame 8 of the bicycle to a lower point than the lowest movement of a pedal, thus making the use of the bicycle precarious and undesireable. I overcome this difficulty by making the limb 42, to the end of which the left side pedal L14 must be attached, integral with and supplanting the similar link 12 on the right side of the bicycle as illustrated by the isometric view FIG. 4, the connecting loop 43 of the two links passing through bearing 15 in frame 8. Thus, when pedal L14 is depressed on the left side of the bicycle, the links 12 on the right side will operate correctly, similar to pressing R14 pedal.

In FIG. 7 I show an alternate means of rotating axle 10 which is attached to wheel 9, a U-shaped rack 44 being attached to the rear end of the pantograph links 17, the two legs of the rack having teeth pointed inwards in the direction shown so that its teeth on contact with similar teeth 45 of pinion 50, attached to shaft 10, will rotate only in the direction of arrow 25, that is, forward on the bicycle. Pulling the rack forward in the direction of arrow 65 will cause the teeth 46 on the upper leg of the rack to mesh with the teeth 45 on pinion 50 and will force the bicycle forward while the teeth on the lower side of pinion 50 will slip over teeth 47 on the lower leg of the rack 44, these legs on the U-shaped rack being slightly springy and flexible for that purpose, a spring 48, attached to the ends of each leg tensioning the rack legs slightly towards each other. As the rack 44 reciprocates horizontally, the next stroke of the pantograph will be in the direction of arrow 49 in which case the sharp edges of teeth 47 on the lower leg of rack 44 will engage the teeth 45 on the lower side of pinion 50 and again rotate the pinion in the same direction as arrow 25, thus providing a practically continuous rotation in one direction to wheel 9. A lubricant applied to the teeth 45 of pinion 50 will permit easy slippage of the teeth on one side of the pinion while the other side teeth are in mesh. During the shorter strokes of the pedals as illustrated in FIG. 2, the strokes will naturally be faster but the bicycle may operate at normal speed. Of course the bicycle will be supplied with a brake, not shown, for stopping purposes.

From the foregoing description it will be apparent that I have evolved a new and useful Bicycle Operating Meens which requires much less muscular effort and eliminates useless motion of the legs and feet than the conventional sprocket and chain method, a motion of the legs in which a sort of almost effortless side wobbling will suffice to propel the bicycle over long distances with a minimum of effort and automatic adjustment of the "speed ratio" which when traversing upgrade will automatically adjust to the required speed and incidentally enable the cyclist to traverse upgrades at angles heretofore deemed impossible heretofore. This bicycle operating means is not confined to two wheeled bicycles but may also be satisfactorily used in four or three wheeled vehicles as desired.

I claim:

1. In a bicycle or similar vehicle, a means for manually propelling same, said means comprising a lazy-tong mechanism a front horizontally extending joint thereof being attached to the frame of said bicycle, the substantially vertically disposed joints of said lazy-tong mechanism having foot pedals pivotally attached thereto, and the rear horizontally disposed joints being attached to a U-shaped rack, the arms of said U-shaped rack being slightly flexible and the inwardly projecting edges thereof being provided with sharp pointed teeth, the teeth on the upper arm being inclined forwardly while the teeth on the lower arm are inclined rearwardly, and an extending axle on the rear wheel of said bicycle, a pinion secured to said axle, the said pinion having teeth on its periphery, said teeth being inclined to mesh with the teeth of the U-shaped arms when either of said arms contact said pinion and to slide over said teeth on said pinion when the teeth of the opposite arm is in mesh with the teeth of said pinion.

2. In a bicycle or similar vehicle as defined in claim 1, and a spring means on the ends of said rack arms to tension said arms slightly towards each other to enable the sharp teeth on said arms to be adjusted to either mesh with or slide over same as desired or both simultaneously.

3. In a bicycle or similar vehicle as defined in claim 1, and means for limiting the extent of the upward and downward movement of said pedals, said means consisting of an adjustable bolt threaded into the frame of said bicycle at a position in said frame near where a limb of said lazy-tong mechanism operates, the end of said bolt contacting said limb preventing further upward or downward movement of said lazy-tong mechanism.

4. In a bicycle or similar vehicle as defined in claim 1, the said lazy-tong mechanism being attached to said bicycle only on one side thereof, and a guard for same, said guard covering the extent of operation thereof and being attached to the frame of said bicycle at its front end and to the axle of the rear wheel at the rear end thereof, and a slot in said guard, said slot comprising a guide for the pedal on that side of the bicycle.

5. In a bicycle or similar vehicle as defined in claim 1, the degree of downward pressure by the foot of a cyclist onto said upper pedal being automatically lessened as said upper pedal moves to the horizontal "dead center" of said lazy-tong mechanism and correspondingly increases in pressure as said pedal moves to its lowest position on said lazy-tong mechanism.

6. A bicycle or similar vehicle as defined in claim 1, the said pedals being on the right and left side of said bicycle frame and adapted to alternate up and down respectively, the said lazy-tong mechanism being on the right side of said bicycle frame with a pedal pivotally mounted to the joint of the two upper extending limbs of said lazy-tong mechanism, and the pedal on the left side of said bicycle frame being mounted to the end of a single limb on the left side of said bicycle frame, said limb being parallel with the limb unoccupied by a pedal on the right side of the said frame, and a yoke, said yoke securing the two ends of said limbs and said yoke also acting as a shaft in the front joint of said lazy-tong mechanism in the bearing of said bicycle frame.

7. In a bicycle or similar vehicle, a means for propelling same, said means comprising a lazy-tong mechanism the front end thereof being attached to a forward part of the bicycle, an upper and directly lower joint of said lazy-tong mechanism having a foot pedal pivotally attached thereto, and the rear joint of said lazy-tong mechanism being attached to the ends of two belts, a wheel and axle rotatably mounted to the rear frame of said bicycle, a pinion attached securely to said axle, said pinion being provided with teeth on each side thereof, and two pulleys, said pulleys being loosely and rotatably mounted to said axle on either side of said pinion and having teeth on the pinion side of said pulleys, said teeth being adapted to mesh with the teeth of said pinion only when either of said pulleys are pulled by either of said belts by the action of said pedals onto said lazy-tong mechanism to rotate said pinion and wheel to propel said bicycle in a forward direction.

8. A bicycle or similar vehicle as defined in claim 7, and a spring attached between said bicycle frame and each of said pulleys to normally force the teethed side of each pulley toward the pinion and to simultaneously tend to rotate said pulleys in the opposite direction to the rotation of said pinion and wheel.

* * * * *